US007231859B2

(12) United States Patent
Lawrence

(10) Patent No.: US 7,231,859 B2
(45) Date of Patent: Jun. 19, 2007

(54) MAIL OPENER APPARATUS

(75) Inventor: Anthony Lawrence, Uxbridge (GB)

(73) Assignee: Neopost Limited, Romford, Essex (GB)

( * ) Notice: Subject to any disclaimer, the term of this patent is extended or adjusted under 35 U.S.C. 154(b) by 0 days.

(21) Appl. No.: 09/770,185

(22) Filed: Jan. 29, 2001

(65) Prior Publication Data

US 2001/0010184 A1 Aug. 2, 2001

(30) Foreign Application Priority Data

Jan. 29, 2000 (GB) ................................ 0002024.8

(51) Int. Cl.
*B23D 19/00* (2006.01)

(52) U.S. Cl. .......................... 83/508.1; 83/563; 83/912

(58) Field of Classification Search .................. 83/401, 83/563, 508.1, 564, 360, 368, 370, 477.1, 83/491, 912; 101/72, 66, 93, 93.02, 95; 400/621; 53/435, 66; 270/5.02, 21.1, 52.17
See application file for complete search history.

(56) References Cited

U.S. PATENT DOCUMENTS

| | | | | |
|---|---|---|---|---|
| 3,739,670 | A * | 6/1973 | Amakawa et al. | 83/210 |
| 3,757,685 | A * | 9/1973 | Woodie et al. | 101/66 |
| 3,927,589 | A | 12/1975 | Emkjer et al. | |
| 4,419,915 | A * | 12/1983 | Oussani | 83/887 |
| 4,493,252 | A * | 1/1985 | Clark | 101/71 |
| 4,926,729 | A * | 5/1990 | Igarashi | 83/364 |
| 5,020,429 | A * | 6/1991 | Riley et al. | 101/93 |
| 5,271,322 | A * | 12/1993 | Palma | 101/333 |
| 5,596,916 | A | 1/1997 | Gallagher et al. | |
| 5,768,675 | A * | 6/1998 | Estabrooks | 399/385 |
| 5,946,996 | A * | 9/1999 | Oussani, Jr. et al. | 83/444 |
| 6,014,921 | A * | 1/2000 | Angel et al. | 83/862 |
| 6,032,138 | A * | 2/2000 | McFiggans et al. | 705/410 |
| 6,824,322 | B2 * | 11/2004 | Miyajima | 400/621 |

FOREIGN PATENT DOCUMENTS

| | | |
|---|---|---|
| EP | 0282359 | 9/1988 |
| EP | 0927649 | 7/1999 |
| GB | 2147853 | 10/1984 |

* cited by examiner

*Primary Examiner*—Boyer D. Ashley
*Assistant Examiner*—Omar Flores Sánchez
(74) *Attorney, Agent, or Firm*—Shoemaker and Mattare

(57) ABSTRACT

A mail opener comprises a cuffily device which is movable between an operating position and a retracted position where it is inoperative. The position of the cutting device is controllable by a drive device controlled by the postage meter. The arrangement is such that a single post station can be provided for both applying postage and opening mail. The post station incorporates a safety measure to prevent newly franked outgoing mail from being inadvertently opened or damaged by the mail opener.

10 Claims, 5 Drawing Sheets

MAIL OPENER APPARATUS

BACKGROUND OF THE INVENTION

This invention relates to mail opener apparatus for use in combination with a postage meter.

Mail opener devices are well known. Generally these devices comprise a cutting device, typically a blade, which is used to slice open a closed mail piece such as an envelope or a small package allowing the contents to be removed. Such cutting devices may be hand operated or driven by mechanical means.

SUMMARY OF THE INVENTION

In accordance with the present invention there is provided a mail opener for use with a postage meter; said postage meter including printing means operable to print postal indicia on amil pieces;

said mail opener comprising a cutting device, the cutting device being movable between an operative position to open mail pieces and a retracted inopertive position in which the cutting device is maintained out of engagement with mail pieces; drive means operable to displace the cutting device between said operative position and said retracted inoperative position, said drive means being operable by said postage meter to maintain said cutting device in said retracted inoperative position when the printing means is operable to print postal indicia.

Modern postage meters generally comprise a printing module which incorporates a print head for printing indicia such as post marks on mail pieces passed through the meter, and an accounting module which carries out accounting functions in respect of postage values to be applied to the mail pieces. The print head is movable between a printing position and a service position where printing cannot be effected. In pre-payment meters the print head is only enabled to effect printing when the accounting module has effected accounting in respect of the value of the post mark desired to be applied. Once the desired postmark has been applied, the print head is returned to its service position. Other forms of postage meter are known with different arrangements of printer and accounting system, however, these will share the characteristic that printing cannot be effected until accounting has taken place.

It will be understood that only outgoing mail is desirably franked for postage by a postage meter and only incoming mail is desirably opened by a mail opener. Thus it is desirable that any mail handling or processing station incorporating both a postage meter and a mail opener is constructed and controlled to prevent inadvertent opening of or damage to outgoing mail. This can be achieved by the present invention. By providing a means of communication between the postage meter and the mail opener, the mail opener can be rendered inactive when the postage meter is made active.

The means of communication may be provided in mechanical or electrical form or by the sending of signals such as electromagnetic radiation waves from one device to the other.

Conveniently the devices communicate through mechanical interlocking means being arranged such that movement of the print head of the postage meter into the printing position causes a simultaneous movement of the cutting device of the mail opener into a stowage position. This may be achieved by means of a cam slider arrangement. For example, the cutting device may be carried by a shaft which is movable axially in bearings between retracted and operative positions, one end of the shaft in turn being slidable in a slot on a cam slider. The cam slider in turn communicates with the postage meter and is caused to move as the print head moves between its printing and service positions. As the cam slider moves, the shaft carrying the cutting device is engaged in the suitably arranged slot between the operating position and retracted position.

Where the postage meter and mail opener are electrically connected to each other a circuit may be provided which senses or responds to movement of the print head and initiates in response the required movement of the cutting device. Similarly, the cutting device may be controlled by a radiated signal sent by a control system in the postage meter in response to movement of the print head. Thus mail undergoing franking by the postage meter cannot be damaged by the retracted cutting device.

The cutting device may be provided in the form of a flat blade which can be used to slit a seam of the mail piece or the mail piece may be drawn across the blade to remove the edge of the mail piece and allow access to the contents for removal. Preferably, the blade is a rotary blade, such an arrangement generally involves less friction and provides a cleaner cut. Optionally, the mail opener further comprises means for drawing the mail past the cutter to facilitate opening. Conveniently, these drawing means are provided in the form of a set of feed rollers. The feed rollers may optionally be those already present on the postage meter for ejecting franked mail from the postage meter. Preferably, separate rollers are provided on the mail opener, this allows the mail to be drawn past the cutter at a lower speed than is possible when using the postage meter feed rollers. The position and/or rotating speed of the rollers may be adjustable to suit the characteristics of the package to be opened. For example, at least one of the rollers may be resiliently mounted to allow the rollers to be separated by varying amounts to accommodate different thicknesses of mail.

The mail opener may be configured for attachment to existing postage meters, for example by mechanical fixing to the moving parts of the postage meter. Alternatively, the mail opener may be "built in" to the postage meter during manufacture. The mail opener may share a common power source with the postage meter or may be provided with its own independent power source.

Thus it can be seen that the apparatus provides a multi function mail handling or processing station in compact form with built in safety features.

BRIEF DESCRIPTION OF THE DRAWING

An embodiment of the invention will now be described by way of example only, with reference to the drawings in which.

DESCRIPTION OF THE PREFERRED EMBODIMENT

Figure 1:
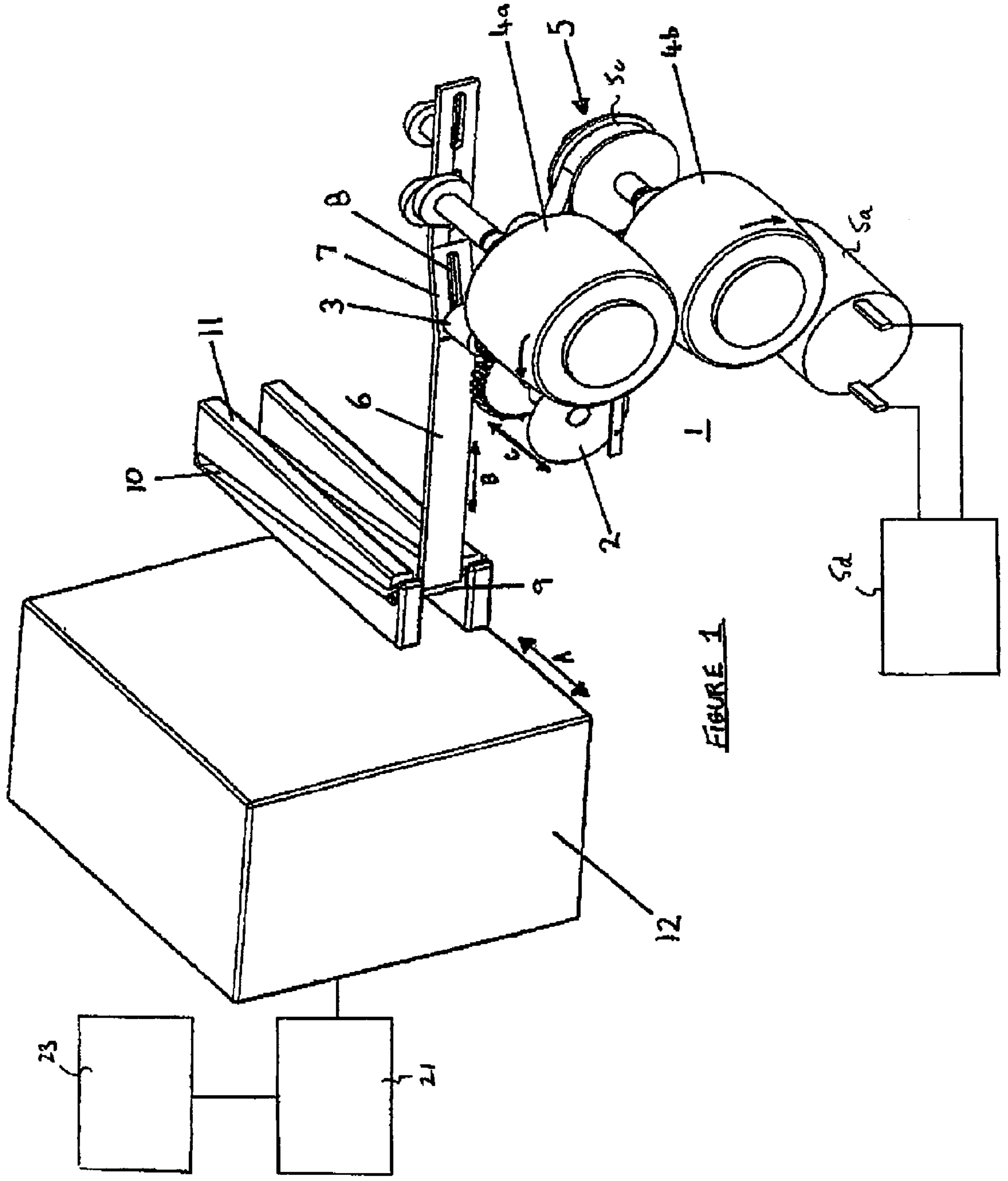
FIG. 1 shows, from a front perspective view, the operating parts of a mail opener according to the present invention controlled by a postage meter.
Figure 2:
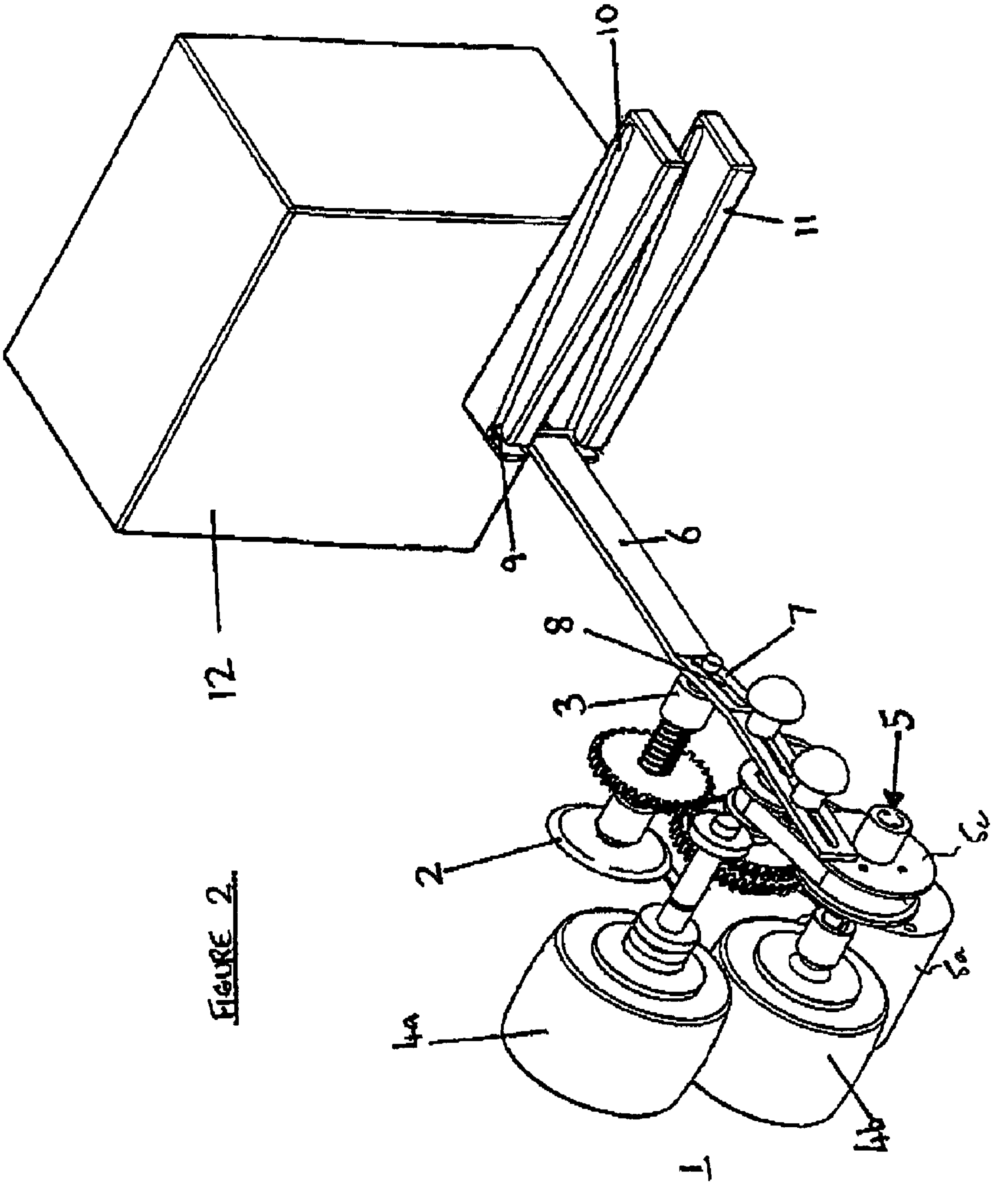
FIG. 2 shows, from a rear perspective view, the operating parts of the mail opener of FIG. 1 controlled by the postage meter.
Figure 3:
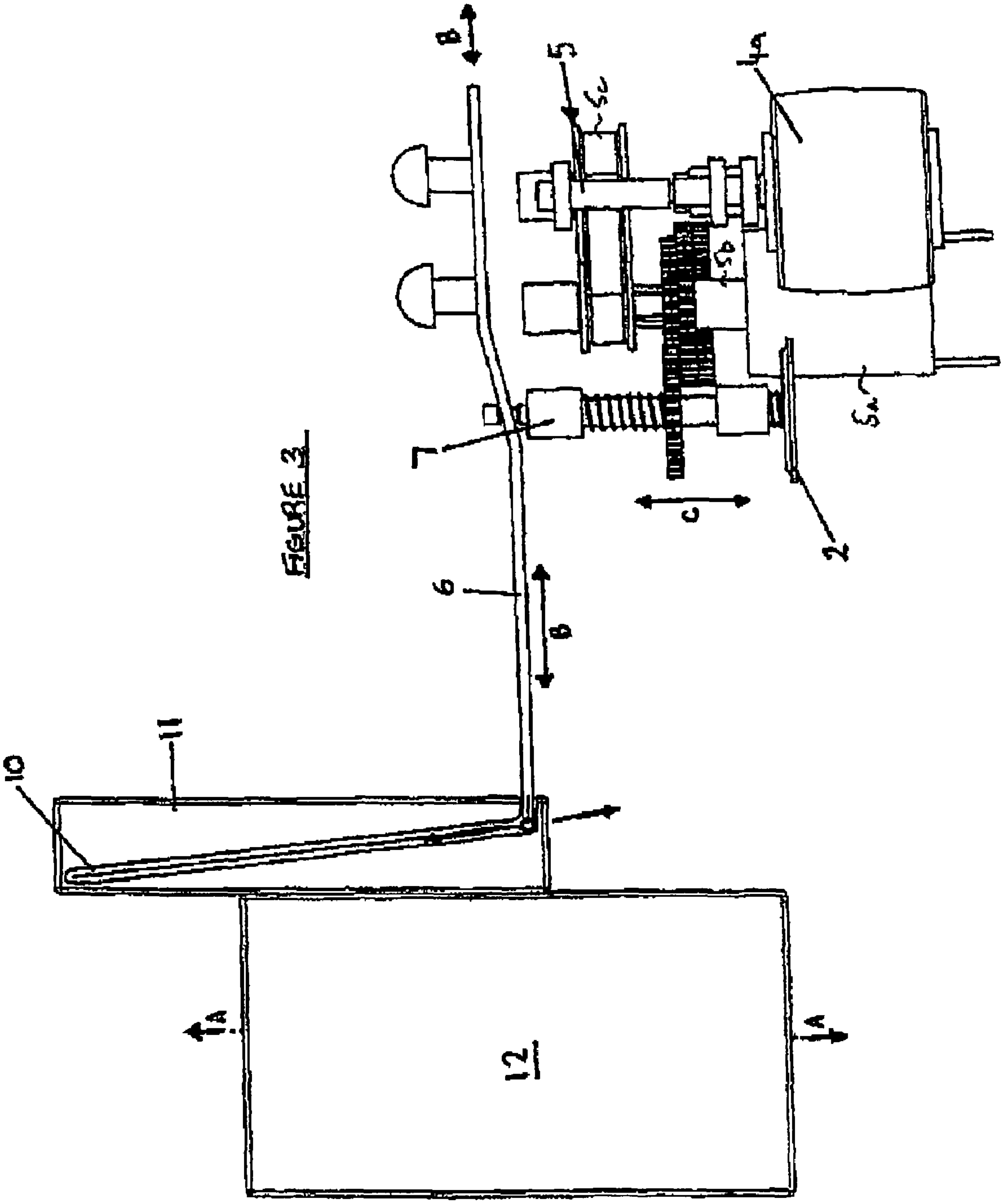
FIG. 3 shows from above of the operating parts of the mail opener controlled by a postage meter.
Figure 4:
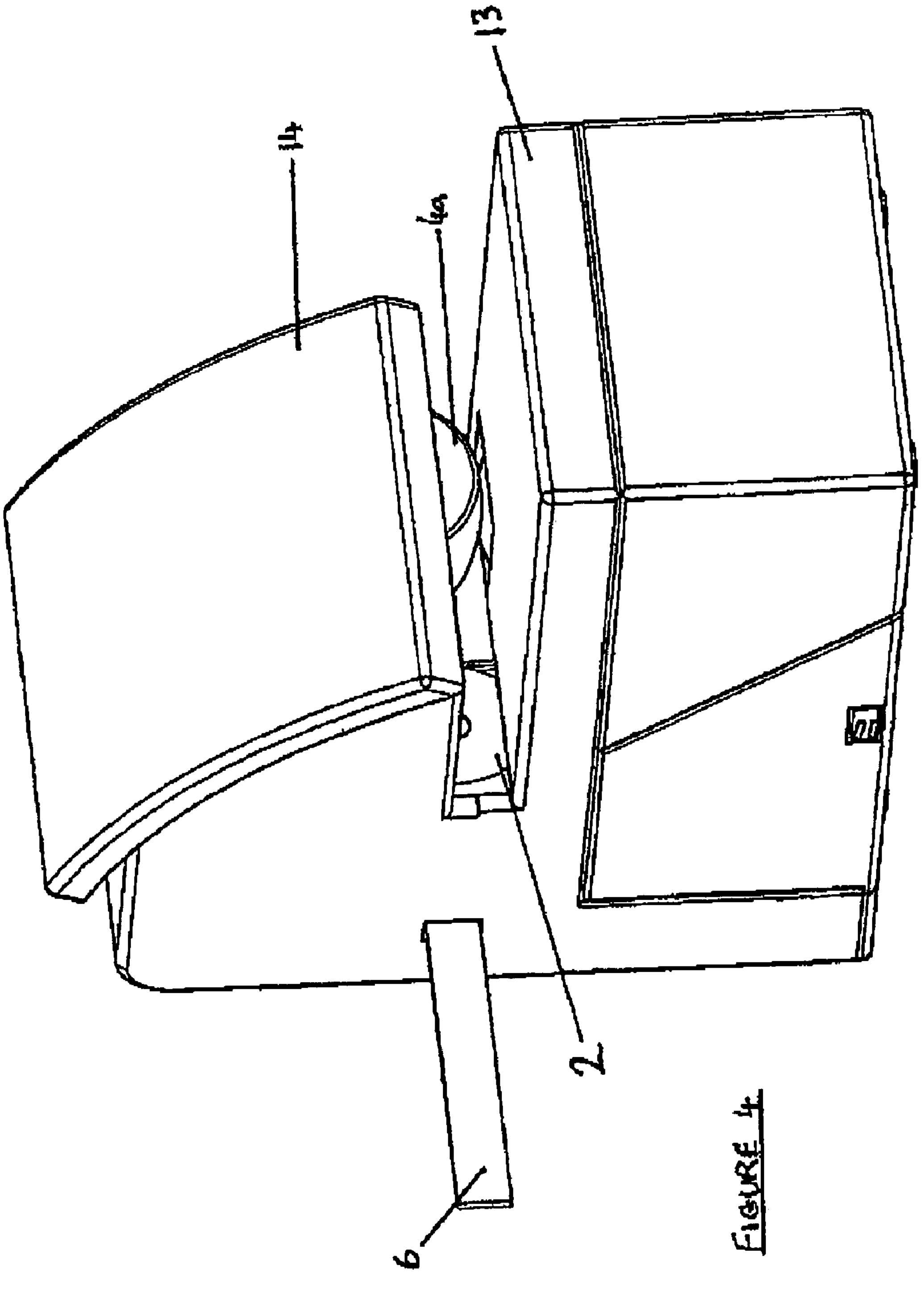
FIG. 4 shows the mail opener in a housing thereof and having means for attachment to the postage meter.

As can be seen from the Figures, a mail opener generally designated as a comprises a rotary blade 2 carried by a rotatable shaft 3 which is displaceable along axis C. A feed roller 4*b* and pressure roller 4*a* are positioned adjacent and down stream of the rotary blade for drawing mail past the blade. The roller 4*b* and rotatable shaft 3 are driven by drive mechanism 5 which briefly comprises a drive motor 5*a* driving an idler shaft 5*b* and a belt drive 5*c* from the idler shaft 5*b* to the drive lower roller 4*b*, and speed adjustment means 5*d* for adjusting the speed of the drive motor 5*a*. The idler shaft also carries a gear which meshes with a gear carried by rotatable shaft 3 thereby rotating the cutter blade. The gear carried by the rotatable shaft is maintained in driven engagement with the drive gear by a spring.

A cam slider 6, displaceable in the direction of arrow B, comprises a strip of rigid material having an angled cam portion 7 which is inclined to the direction B of displacement of the cam slider. The cam portion has a slot 8 therein in which a free end of the rotatable shaft 3 is slidably engaged. An end portion 9 of the cam slider 6 interrelates with a pair of guides 11 which each have an angled slot 10 in which the end portion 9 is slidable. The pair of guides 11 are fixedly mounted to the print head carrier 12 of a postage meter. The print head carrier 12 carries the print head between printing and service positions of the print head.

The print head carrier 12 moves fore and aft along an axis designated by arrow A in FIG. 1, when printing of indicia is to be effected, the print head carrier 12 moves forward along axis A carrying with it guide pair 11. The mail opener body is fixed in position, relative to the postage meter. The cam slider 6, rotary cutter 2 and its shaft 3 are free to move relative to the body of the mail opener. Movement of the print head carrier of the postage meter forwardly to move the print head from the service position to the operative printing position, causes, due to engagement of the end portion 9 in the slots 10, movement of the cam slider 6 towards the print head carrier 12 along axis B. Consequent movement of the inclined cam portion 7 of the cam slider S draws the rotatable shaft 3 rearwardly in the direction of arrow C and thus the blade, carried by the shaft 3, is moved into a retracted position where it cannot be engaged by mail pieces and hence cannot inadvertently damage outgoing mail that has been passed through the postage meter.

When printing of a postage indicium has been completed, the print head carrier is moved rearwardly in the direction of arrow A to carry the print head from the operative printing position into the service position. As a result of this rearward movement of the print head carrier, the pair of guides 9 also move rearwardly in the direction of arrow A and the engagement of the end portion 9 of the cam slider 6 in the slots 10 of the pair of guides causes the cam slider to move, in the direction of arrow B from left to right as seen in the drawings. The cam portion acts on the end of the rotatable shaft 3 to move the shaft 3 and cutting blade 2 carried thereby in the direction of arrow C whereby the cutting blade is moved from the inoperative retracted position into the operative mail piece opening position.

The mail opener is contained in a housing 13 which carries a protective guard 14 to prevent inadvertent interference with and potential injury from the enclosed rollers and rotary blade. A mail guide 16 is provided on the mail opener which is aligned with a mail feeding guide 17 on the postage meter. When a mail piece is fed with an edge 18 thereof in engagement with the guide 17 and the rotary cutter 2 is in the operative mail opening position as shown in FIG. 5, the rotary cutter blade 2 extends beyond the edge 18 of the mail piece by a small distance sufficient such as to cut only the edge 18 from the mail piece.

Consequently contents of the mail piece are not damaged by the action of the cutter blade. When the rotary cutter blade 2 is retracted to the operative position by the cam portion 7, the cutter blade is disposed at a position spaced from the edge 18 of the mail piece in which the cutter blade cannot engage the mail piece.

Thus it can be seen that when the print head carrier moves the print had into an operative printing position, the cam portion 7 retracts the cutter blade into an inoperative position and when the print head carrier moves the print head into an inoperative printing position at the service position, the cam portion 7 moves the cutter blade into the operative position. Thus during franking of outgoing mail the mail opener is rendered inoperative.

Figure 5:
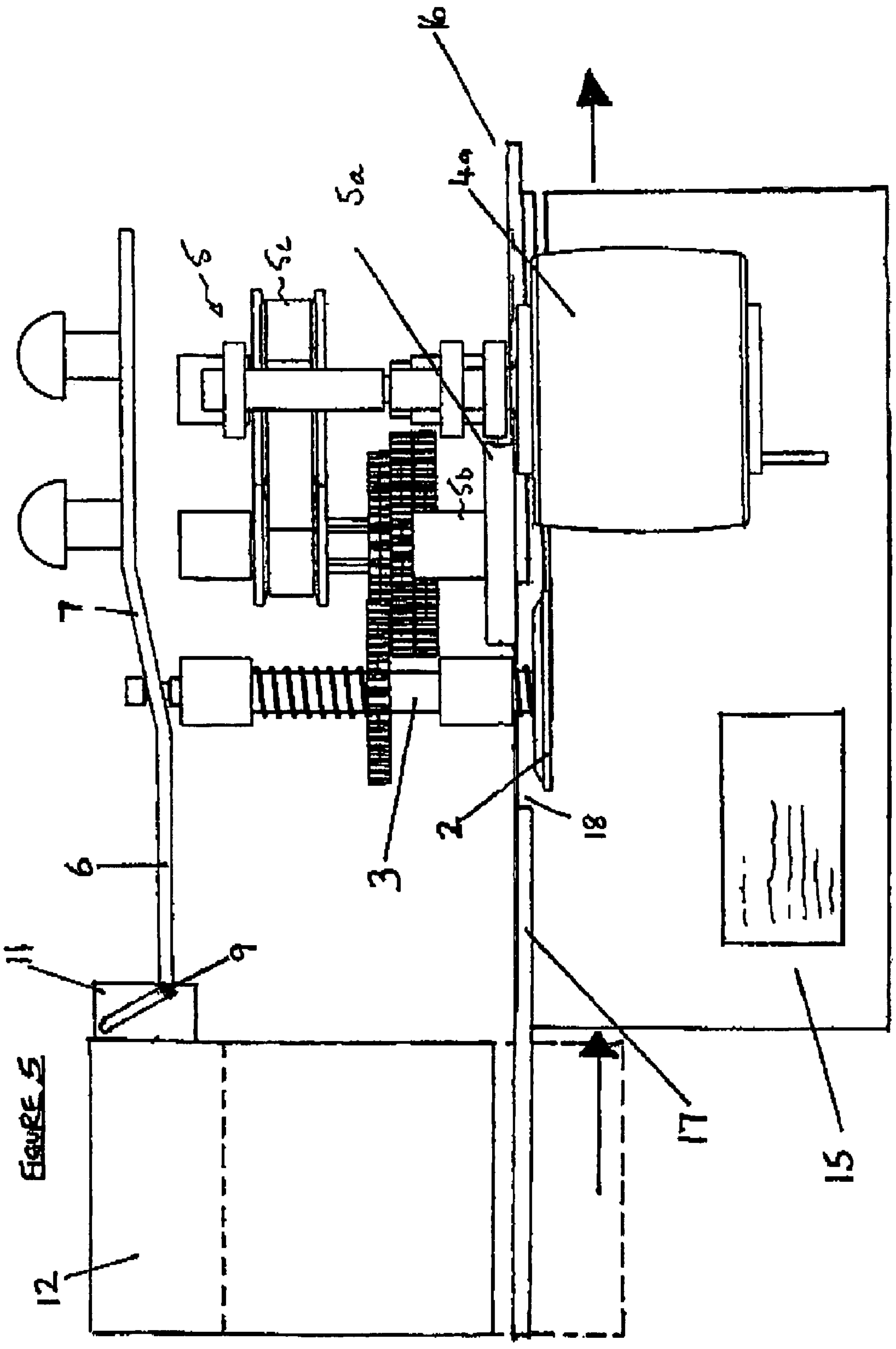
FIG. 5 shows a mail piece being opened by the mail opener.

As can be seen from FIG. 5, a mail piece 15 is fed with an edge 18 thereof just beyond the edge of the rotary blade 2 in its operating position. The mail piece 15 is fed by the postage meter under the rotating blade 2 and enters a nip between rotating feed roller 4*b* and idler roller 4*a*. The feed rollers 4*a* and 4*b* then draw the mail piece 15 past the blade 2 and the opened mail piece 15 is ejected.

The mail piece is guided by mail guide 16 to provide a straight cut adjacent to the edge 18 of the mail piece to avoid damage to the contents. While the rotary cutter is in its operating position as shown in FIG. 5, the print head carrier 12 is in its service station position behind the mail guide 16. The dotted line indicates the position of the print head carrier when the print head is in the operative printing position. When the rotary cutter 2 is in the retracted position, the rotary cutter is disposed to lie behind the surface of the mail guide 16 that is engaged by the mail pieces so that the rotary cutter cannot engage and damage the outgoing franked mail pieces.

It is to be understood that the foregoing represents just one embodiment of the invention others of which will no doubt appear to the skilled reader without deviation from the true scope of the invention as claimed in the appended claims.

In one embodiment, as illustrated in FIG. 1, the mail opener 1 includes an electrical circuit 21 which is responsive to movement of the print head to operate the print head carrier 12 to locate the rotary blade 2 in the inoperative position in response to the print head carrier 12 being moved to the operative position.

In one embodiment, as iullustrated in FIG. 1, the postage meter includes signal generation means 23 which is operative to generate a signal in response to the print head moving to the operative position, and the electrical circuit 21 is responsive to the generated signal.

I claim:

1. A mail opener for use with a postage meter including a print head movable between an operative, printing position and an inoperative-position in which printing of mail pieces cannot be effected, the mail opener comprising:

a cutting device movable between an operative position to open mail pieces and a retracted, inoperative position in which the cutting device is maintained out of engagement with mail pieces; and drive means operable to displace the cutting device between the operative and inoperative positions, the drive means being operated by movement of the print head into the printing position to move the cutting device into the inoperative position.

2. A mail opener as claimed in claim 1, wherein the postage meter includes a first mail piece feed guide, and the mail opener includes a second mail piece feed guide extending in alignment with the first mail piece feed guide, with the second mail piece feed guide being located to guide an edge of a mail piece into engagement with the cutting device when the cutting device is in the operative position and prevent engagement of mail pieces with the cutting device when the cutting device is in the inoperative position.

3. A mail opener as claimed in claim 1, wherein the cutting device is a rotatably-driven rotary blade.

4. A mail opener as claimed in claim 1, wherein the drive means includes an electrical circuit responsive to movement of the print head to operate the drive means to locate the cutting device in the inoperative position in response to the print head being moved to the operative position.

5. A mail opener as claimed in claim 4, wherein the postage meter includes signal generation means operative to generate a signal in response to the print head moving to the operative position, and the electrical circuit of the drive means is responsive to the generated sign.

6. A mail opener as claimed in claim 1, further comprising:

mechanical interlocking means operatively connected between the printing head and the cutting device.

7. A mail opener as claimed in claim 6, wherein the cutting device is carried by a movable member, and the interlocking means comprises a cam which engages the movable member, with operation of the cam causing movement of the cutting device between the operative and inoperative positions.

8. A mail opener as claimed in claim 1, further comprising:

driven feed means operative to draw mail pieces past the cutting device.

9. A mail opener as claimed in claim 8, wherein the driven feed means comprises a driven feed roller and a pressure roller co-operating therewith.

10. A mail opener as claimed in claim 8, further comprising:

speed adjustment means for adjusting the speed of the driven feed means.

* * * * *